United States Patent
Ilno et al.

(10) Patent No.: US 8,692,725 B2
(45) Date of Patent: Apr. 8, 2014

(54) PATCH ANTENNA DEVICE

(75) Inventors: Shinji Ilno, Tokyo (JP); Seiichi Wada, Tokyo (JP); Ryuichi Taira, Tokyo (JP)

(73) Assignee: Harada Industry Co., Ltd., Tokyo (JP)

( * ) Notice: Subject to any disclaimer, the term of this patent is extended or adjusted under 35 U.S.C. 154(b) by 890 days.

(21) Appl. No.: 12/809,466

(22) PCT Filed: Dec. 19, 2008

(86) PCT No.: PCT/JP2008/003854
§ 371 (c)(1),
(2), (4) Date: Jun. 30, 2010

(87) PCT Pub. No.: WO2009/081557
PCT Pub. Date: Jul. 2, 2009

(65) Prior Publication Data
US 2011/0260934 A1 Oct. 27, 2011

(30) Foreign Application Priority Data
Dec. 20, 2007 (JP) .................................. 2007-329211

(51) Int. Cl.
*H01Q 1/34* (2006.01)
*H01Q 7/00* (2006.01)
*H01Q 9/04* (2006.01)

(52) U.S. Cl.
USPC ..................... 343/711; 343/866; 343/700 MS (58) Field of Classification Search
USPC .......................................................... 343/711
See application file for complete search history.

(56) References Cited

U.S. PATENT DOCUMENTS

| | | | |
|---|---|---|---|
| 3,659,678 A | 5/1972 | Hall, Jr. | |
| 4,490,003 A | 12/1984 | Robinson | |
| 4,563,659 A | 1/1986 | Sakamoto | |
| 4,781,623 A | 11/1988 | Philippson et al. | |
| 5,195,014 A | 3/1993 | Krantz, Jr., et al. | |
| 5,198,958 A | 3/1993 | Krantz, Jr., et al. | |
| 5,363,114 A | 11/1994 | Shoemaker | |
| 5,525,071 A | 6/1996 | Obara et al. | |
| 5,565,877 A | 10/1996 | Du et al. | |
| 5,668,559 A | 9/1997 | Baro | |
| 5,732,440 A | 3/1998 | Wright | |
| 5,757,327 A | 5/1998 | Yajima et al. | |
| 5,797,771 A | 8/1998 | Garside | |
| 5,995,064 A | 11/1999 | Yanagisawa et al. | |

(Continued)

FOREIGN PATENT DOCUMENTS

| CN | 201041825 | 3/2008 |
|---|---|---|
| CN | 101049878 | 7/2009 |

(Continued)

*Primary Examiner* — Jerome Jackson, Jr.
*Assistant Examiner* — Ricardo Magallanes
(74) *Attorney, Agent, or Firm* — Wells St. John P.S.

(57) ABSTRACT

Provided is an in-vehicle patch antenna device which has a reduced size and multiple functions while improving performance. An in-vehicle patch antenna device includes a substrate (10), a ground conductor (20) provided on the substrate (10), an antenna element section (30) and a reporting circuit section (40). The antenna element section (30) has a feeding section (31) and is provided on a surface of the substrate (10) opposite to a surface on which the ground conductor (20) is provided. The reporting circuit section (40) is provided on the substrate (10) and connected around an area in a periphery of the antenna element section (30) at which current distribution is minimal other than the peripheral area thereof where the feeding section (31) is provided.

8 Claims, 5 Drawing Sheets

(56) References Cited

U.S. PATENT DOCUMENTS

| | | |
|---|---|---|
| 6,175,080 B1 | 1/2001 | Nightingale |
| 6,177,911 B1 | 1/2001 | Yuda et al. |
| 6,310,586 B1 | 10/2001 | Takahashi et al. |
| 6,486,842 B2 | 11/2002 | Wang |
| 6,747,603 B1 | 6/2004 | Tornatta et al. |
| 6,879,301 B2 | 4/2005 | Kozlovski |
| 6,940,366 B2 | 9/2005 | Komiya |
| 7,019,701 B2 | 3/2006 | Ohno et al. |
| 7,037,144 B2 | 5/2006 | Wang et al. |
| 7,148,850 B2 | 12/2006 | Baliarda et al. |
| 7,156,678 B2 | 1/2007 | Feldman et al. |
| 7,164,386 B2 | 1/2007 | Baliarda et al. |
| 7,170,459 B1 | 1/2007 | McKim |
| 7,202,822 B2 | 4/2007 | Baliarda et al. |
| 7,210,965 B1 | 5/2007 | Zhong et al. |
| 7,271,773 B2 | 9/2007 | Gorai et al. |
| 7,312,761 B2 | 12/2007 | Tatsuo |
| 7,394,438 B2 | 7/2008 | Forster et al. |
| 7,414,588 B2 | 8/2008 | Tateno |
| 7,420,517 B2 | 9/2008 | Oshima et al. |
| 7,554,490 B2 | 6/2009 | Baliarda et al. |
| 7,598,913 B2 * | 10/2009 | Rao et al. ............... 343/700 MS |
| 7,671,504 B2 | 3/2010 | Rohrer et al. |
| 7,845,983 B2 | 12/2010 | Kawada et al. |
| 7,868,834 B2 | 1/2011 | Ortigosa et al. |
| 7,928,913 B2 | 4/2011 | Kaneda et al. |
| 7,952,533 B2 | 5/2011 | Hur et al. |
| 7,961,065 B2 | 6/2011 | Kobayashi et al. |
| 8,207,893 B2 | 6/2012 | Baliarda et al. |
| 8,212,726 B2 | 7/2012 | Baliarda et al. |
| 8,471,772 B2 | 6/2013 | Baliarda et al. |
| 8,497,807 B2 | 7/2013 | Wakui et al. |
| 8,502,742 B2 | 8/2013 | Wakui et al. |
| 2001/0022716 A1 | 9/2001 | Glaser et al. |
| 2001/0050649 A1 | 12/2001 | Wang |
| 2002/0050873 A1 | 5/2002 | Tsunoda et al. |
| 2002/0080088 A1 | 6/2002 | Boyle |
| 2003/0058186 A1 | 3/2003 | Saito et al. |
| 2003/0112191 A1 | 6/2003 | Maeda et al. |
| 2003/0228806 A1 | 12/2003 | Wang et al. |
| 2004/0090366 A1 | 5/2004 | Wong et al. |
| 2004/0119644 A1 | 6/2004 | Puente-Baliarda et al. |
| 2004/0233108 A1 | 11/2004 | Bordi |
| 2005/0195112 A1 | 9/2005 | Baliarda et al. |
| 2005/0200530 A1 | 9/2005 | Aikawa et al. |
| 2005/0231427 A1 | 10/2005 | Baliarda et al. |
| 2005/0264456 A1 | 12/2005 | Baliarda et al. |
| 2006/0040562 A1 | 2/2006 | Funatsu |
| 2006/0097937 A1 | 5/2006 | Gorai et al. |
| 2006/0187131 A1 | 8/2006 | Oshima |
| 2006/0232488 A1 * | 10/2006 | Wang et al. ............... 343/795 |
| 2006/0274472 A1 | 12/2006 | Saito et al. |
| 2006/0290587 A1 | 12/2006 | Forster et al. |
| 2007/0152886 A1 | 7/2007 | Baliarda et al. |
| 2007/0279302 A1 | 12/2007 | Byrne et al. |
| 2008/0117111 A1 | 5/2008 | Ikeda et al. |
| 2008/0198082 A1 | 8/2008 | Soler Castany et al. |
| 2009/0109101 A1 | 4/2009 | Baliarda et al. |
| 2009/0115551 A1 | 5/2009 | Kobayashi et al. |
| 2009/0140927 A1 | 6/2009 | Maeda et al. |
| 2009/0153404 A1 | 6/2009 | Ryou et al. |
| 2009/0156059 A1 | 6/2009 | Zhu et al. |
| 2009/0207084 A1 | 8/2009 | Ikeda et al. |
| 2009/0237313 A1 | 9/2009 | Martinez Ortigosa |
| 2009/0267847 A1 | 10/2009 | Sato et al. |
| 2009/0280688 A1 | 11/2009 | Kawada et al. |
| 2009/0284441 A1 | 11/2009 | Wakui |
| 2009/0295645 A1 | 12/2009 | Campero et al. |
| 2009/0303134 A1 | 12/2009 | Baliarda et al. |
| 2010/0007566 A1 | 1/2010 | Kobayashi et al. |
| 2010/0009565 A1 | 1/2010 | Wang |
| 2010/0245189 A1 | 9/2010 | Wang |
| 2010/0265147 A1 | 10/2010 | Wakui et al. |
| 2010/0277380 A1 | 11/2010 | Breden et al. |
| 2011/0074524 A1 | 3/2011 | Nishioka |
| 2011/0102269 A1 | 5/2011 | Sato et al. |
| 2011/0177839 A1 | 7/2011 | Baliarda et al. |
| 2011/0181478 A1 | 7/2011 | Baliarda et al. |
| 2011/0181481 A1 | 7/2011 | Baliarda et al. |
| 2012/0326934 A1 | 12/2012 | Wakui et al. |
| 2013/0176180 A1 | 7/2013 | Wakui et al. |

FOREIGN PATENT DOCUMENTS

| | | | |
|---|---|---|---|
| DE | 60105892 | 10/2005 | |
| EP | 1162685 | 12/2001 | |
| JP | 55-138913 | 10/1980 | |
| JP | 59-078711 | 5/1984 | |
| JP | 60-126963 | 8/1985 | |
| JP | 2-32223 | 2/1990 | |
| JP | 04-257111 | 9/1992 | |
| JP | 05-058223 | 3/1993 | |
| JP | H05-058223 | 3/1993 | |
| JP | U1993-039009 | 5/1993 | |
| JP | 05-191124 | 7/1993 | |
| JP | 06-203897 | 7/1994 | |
| JP | 7-38381 | 4/1995 | |
| JP | H07-176929 | 7/1995 | |
| JP | 7272942 | 10/1995 | |
| JP | 9213528 | 8/1997 | |
| JP | 09-232851 | 9/1997 | |
| JP | 10-056315 | 2/1998 | |
| JP | 11-040920 | 2/1999 | |
| JP | 2000-353573 | 12/2000 | |
| JP | 2001-127522 | 5/2001 | |
| JP | 2001-291540 | 10/2001 | |
| JP | 2001-345613 | 12/2001 | |
| JP | 2003-264043 | 9/2003 | |
| JP | 2004-031068 | 1/2004 | |
| JP | 2004-082749 | 3/2004 | |
| JP | 2004-153502 | 5/2004 | |
| JP | 2004-159153 | 6/2004 | |
| JP | 2005-102031 | 4/2005 | |
| JP | 2005-110200 | 4/2005 | |
| JP | 2006-033172 | 2/2006 | |
| JP | 2006-059646 | 3/2006 | |
| JP | 2006-108848 | 4/2006 | |
| JP | 2006-121369 | 5/2006 | |
| JP | 2006-166041 | * 6/2006 | ............. 343/700 MS |
| JP | 2006-178647 | 6/2006 | |
| JP | 2006-186881 | * 7/2006 | ................... 343/711 |
| JP | 2007-036354 | 2/2007 | |
| JP | 2007-072952 | 3/2007 | |
| JP | 2007-124892 | 5/2007 | |
| JP | 2008-035479 | 2/2008 | |
| JP | 2008-523671 | 7/2008 | |
| JP | 2009-290377 | 12/2009 | |
| JP | 2010-021856 | 1/2010 | |
| JP | 2011-035519 | 2/2011 | |
| WO | WO 01/31736 | 5/2001 | |
| WO | WO 2008/062746 | 5/2005 | |
| WO | WO 2007/020902 | 2/2007 | |
| WO | PCT/JP2007/000505 | 5/2007 | |
| WO | WO 2008/001482 | 1/2008 | |
| WO | PCT/JP2010/058364 | 5/2010 | |
| WO | PCT/JP2012/050627 | 9/2012 | |

* cited by examiner

PATCH ANTENNA DEVICE

CROSS REFERENCE TO RELATED APPLICATION

This is a 35 U.S.C. §371 application of and claims priority to International Application No. PCT/JP2008/003854, which was filed on Dec. 19, 2008, and which claims priority to Japanese Patent Application No. 2007-329211 filed on Dec. 20, 2007, and the teachings of all the applications are incorporated herein by reference.

TECHNICAL FIELD

The present invention relates to a patch antenna device, and more particularly to an in-vehicle patch antenna device capable of achieving size reduction while improving performance.

BACKGROUND ART

A patch antenna is a known in-vehicle antenna device that can be used for a non-stop automatic toll collection system (ETC: Electronic Toll Collection System). The patch antenna is referred to as a microstrip antenna and has a short height and a narrow bandwidth. The patch antenna has a structure in which an antenna element thereof is provided on a ground conductor with a substrate or an air gap positioned in between.

Further, there is an antenna device that incorporates an electric circuit such as a light-emitting diode, a speaker, or the like so as to exhibit a function of reporting the operation or state of the antenna device, like one disclosed in Patent Document 1 or Patent Document 2. A microstrip antenna with a light-emitting diode disclosed in Patent Document 1 has a light emitting diode provided at a part where the potential difference between an antenna element and a ground conductor becomes minimal when the antenna element resonates to thereby reduce the area of a substrate around the periphery of the antenna element. A speaker-integrated antenna disclosed in Patent Document 2 has a configuration in which a piezoelectric ceramic member is stuck on a ground conductor so as to provide a speaker function to the ground conductor and for reducing the antenna device size. A speaker circuit is connected to the feeding point of the antenna element.

Patent Document 1:
Japanese Patent Application Kokai Publication No. 2006-166041
Patent Document 2:
Japanese Patent Application Kokai Publication No. 2006-186881

DISCLOSURE OF THE INVENTION

Problems to be Solved by the Invention

However, in the antenna device disclosed in Patent Document 1, it is necessary to provide the light-emitting diode at a part where the potential difference between the antenna element and the ground conductor becomes minimal, more specifically, near the center of the antenna element, which reduces installation flexibility of the light-emitting diode to reduce design flexibility of the antenna device as an ETC antenna, etc. A typical ETC antenna device is designed to adhere to the windshield and has an antenna element on the windshield side and a reporting section such as a light-emitting diode or a speaker on the opposite side, i.e., the driver seat side. Further, there is a case where the light-emitting diode and the speaker need to be combined to report the state of the antenna device by means of light and sound. However, in the case of the antenna device disclosed in Patent Document 1, the light-emitting diode is provided near the center of the antenna element or the ground conductor, making it difficult to provide the speaker and light-emitting diode on the same surface while aiming at size reduction. Thus, it was difficult to achieve the combined use of the light-emitting diode and the speaker.

Further, in the antenna device disclosed in Patent Document 2, the antenna element needs to be provided in the air gap, adversely affecting positional accuracy, assembly, and durability. In addition, since the antenna element is spaced from the substrate on which a ground conductor is disposed to be provided in the air gap, making it difficult to achieve reduction in the thickness of an antenna section.

The present invention has been made in view of the above situation, and an object thereof is to provide an in-vehicle patch antenna device capable of achieving size reduction and providing multiple functions while improving performance.

Means for Solving the Problems

To attain the object of the present invention, there is provided a patch antenna device characterized by including: a substrate; a ground conductor provided on the substrate; an antenna element section having a feeding section and degeneracy-removing element sections, which is provided on a surface of the substrate opposite to a surface on which the ground conductor is provided; and a reporting circuit section for reporting a state of the patch antenna device to an outside, which is provided on the substrate and connected around an area in the periphery of the antenna element section at which current distribution is minimal other than the peripheral area thereof where the feeding section is provided.

The antenna element section may have a pattern protruding from the periphery thereof capable of adjusting impedance depending on a width of the pattern, and the feeding section of the antenna element section may be provided within the protruding pattern.

The degeneracy-removing element sections may be loaded in the periphery of the antenna element section so as to be opposite to each other across the antenna element section, and the reporting circuit section may be connected around the area in the periphery of the antenna element section existing on a line connecting the opposing degeneracy-removing element sections or a line orthogonal to the line connecting the opposing degeneracy-removing element sections.

The reporting circuit section may be provided along the periphery of the antenna element section.

The reporting circuit section may include a reporting section and a circuit section. The reporting section may be provided on the surface of the substrate on which the ground conductor is provided, and the circuit section may be provided on the surface of the substrate on which the antenna element section is provided.

The reporting section may include a light-emitting diode and/or a speaker.

The patch antenna device may further include a housing that defines an outer shape of the patch antenna device. One side of the housing that covers the surface on which the reporting section is provided may be made of a transparent or semi-transparent material, and a part of the housing corresponding to a position of the reporting section may have a reduced thickness than the other portions of the housing.

The substrate may have a cutout portion to which a cable connected to the feeding section of the antenna element section is fitted.

The ground conductor may extend up to around the cutout portion.

Advantages of the Invention

The patch antenna device according to the present invention has advantages of improving performance such as gain characteristics by connecting the reporting circuit section to an area other than the feeding section as compared to a patch antenna device having a configuration in which the reporting circuit section is directly connected to the feeding section, as well as, reducing the size and thickness of the patch antenna device by use of a small portion of the periphery of the antenna element section as the connection position of the reporting circuit section. Further, even in the case where the light-emitting diode and the speaker are combined to constitute the reporting section, the size reduction can be achieved.

BRIEF DESCRIPTION OF THE DRAWINGS

FIGS. 1A to 1C are schematic views for explaining an in-vehicle patch antenna device according to the present invention, in which

FIGS. 5A and 5B are views for explaining other shapes of the antenna element section of the patch antenna device according to the present invention, in which

FIGS. 6A and 6B are graphs for comparing characteristics of the patch antenna device of the present invention and characteristics of a conventional example, in which

FIGS. 7A and 7B are views illustrating the patch antenna device of the present invention when being used, in which

EXPLANATION OF REFERENCE SYMBOLS

10: Substrate
11: Cutout portion
12: Speaker through-hole
13: Light emitting diode through-hole
20: Ground conductor
30: Antenna element section
31: Feeding section
32: Degeneracy-removing element section
33: Impedance adjusting section
40: Reporting circuit section
45: Light-emitting diode
46: Speaker
50: Cable
51: Core
52: Ground line
60: Housing
61: Base housing
62: Transparent housing
63: Hole

BEST MODE FOR CARRYING OUT THE INVENTION

Figure 1A:
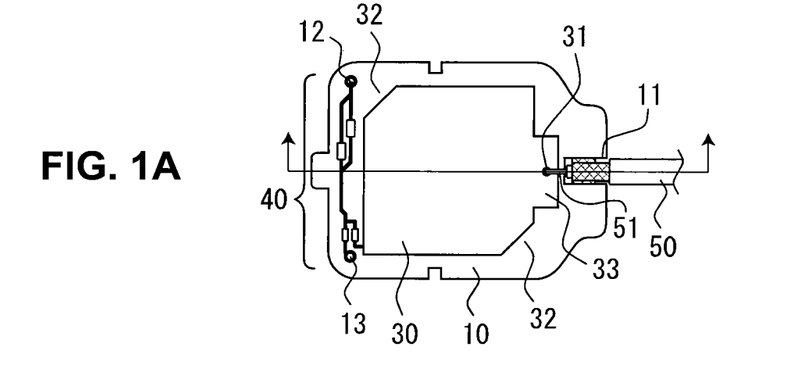
FIG. 1A is a top view thereof.
Figure 1B:
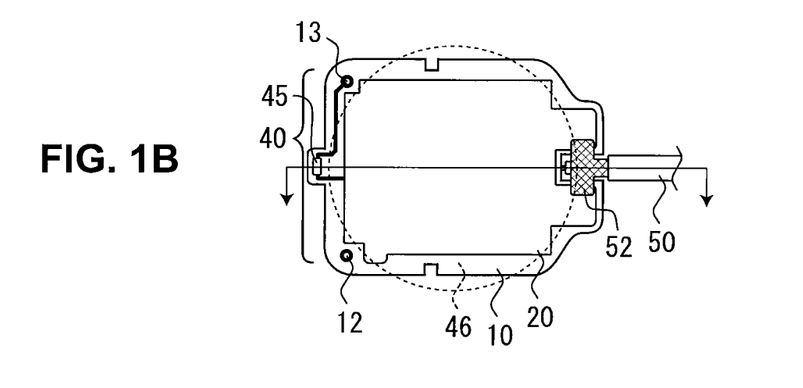
FIG. 1B is a bottom view thereof.
Figure 1C:
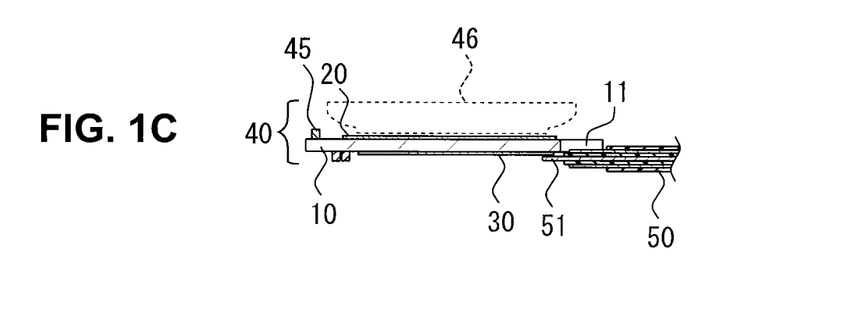
FIG. 1C is a horizontal cross-sectional view illustrating a state where a cable is connected to the antenna device.

A preferred embodiment for practicing the present invention will be described with reference to the accompanying drawings. FIGS. 1A to 1C are schematic views for explaining an in-vehicle patch antenna device according to the present invention, FIG. 1A is a top view thereof, FIG. 1B is a bottom view thereof, and FIG. 1C is a horizontal cross-sectional view illustrating a state where a cable is connected to the antenna device. In the present specification, for convenience of explanation, the side of a substrate on which an antenna element is provided is referred to as a front surface, and the side on which a ground conductor is provided is referred to as a rear surface.

The patch antenna device of the present invention mainly includes a substrate 10, a ground conductor 20, an antenna element section 30, and a reporting circuit section 40. The substrate 10 is so-called a printed board and is made of e.g., a dielectric material. For example, a fluororesin substrate (PTFE: polytetrafluoroethylene) may be used as the substrate 10, and the substrate 10 preferably has a dielectric constant of 2 to 4. The size and shape of the substrate 10 may be determined in accordance with the size of the antenna element section 30 and reporting circuit section 40 to be described later.

In the following description, a case where the patch antenna device of the present invention is applied to an ETC antenna device will mainly be described. In the ETC antenna device, a microwave signal of e.g., 5.8 GHz is used. In the patch antenna device of the present invention, a DC signal and a low-frequency signal for the reporting circuit section are superimposed on the microwave signal to be supplied to the antenna device.

The patch antenna device and an ETC in-vehicle unit (not shown) are connected to each other by a cable 50 such as a coaxial cable. In order to align the height position of a core 51 of the cable 50 with the height position of the surface of the substrate 10 as viewed from the side (FIG. 1C), a cutout portion 11 is formed in the substrate 10 as illustrated in FIGS. 1A and 1B. In the illustrative example, the cutout portion 11 is formed in a protruding portion of the substrate 10 on the side to which the cable 50 is connected. The cutout portion 11 has a cut width of a size to which the protective coating of the cable 50 is fitted. The cable 50 is thus fitted to the cutout portion 11, and an adjustment is made so as to align the height position of the core 51 of the cable 50 with the height position of the surface of the substrate 10. As a result, efficiency of soldering connection between the core 51 of the cable 50 and a feeding section 31 on the substrate 10 can be improved.

A ground conductor 20 made of a conductive material such as a copper foil is provided on the rear side of the substrate 10 so as to cover substantially the entire rear surface of the substrate 10. The ground conductor 20 extends up to around the cutout portion 11. A ground line 52 of the cable 50 fitted to the cutout portion 11 is connected to the ground conductor around the cutout portion 11 by soldering, etc.

The antenna element section 30 made of a conductive material such as a copper foil is provided on the front surface of the substrate 10, i.e., a surface opposite to the surface on which the ground conductor 20 is provided. The ground conductor 20 or the antenna element section 30 may be formed by etching a two-sided printed board.

The antenna element section 30 illustrated in FIGS. 1A to 1C is a single-point feeding type circular polarized patch antenna and has a feeding section 31 and degeneracy-removing element sections 32. More specifically, the main portion of the antenna element section 30 has substantially a square shape having one side of $\lambda/2$ length. The degeneracy-removing element sections 32 are loaded in diagonal corners of the antenna element section 30 so as to generate a circular polarized wave. Since the degeneracy-removing element sections 32 are configured to shift the balance between two orthogonal polarized waves generated in the antenna element section, they may be formed by a cutout portion or protrusion. The feeding section 31 is provided on the center line of the antenna element section 30.

In the illustrative example, an impedance adjusting section 33 is provided on a peripheral portion of the antenna element section 30 in the form of a pattern protruding from the antenna element section 30 for the purpose of adjusting input impedance. More specifically, the impedance adjusting section 33 adjusts the input impedance between the antenna element section 30 and the ETC in-vehicle unit, and the input impedance is adjusted depending on the width and length (area) of the impedance adjusting section 33. The feeding section 31 is provided within the impedance adjusting section 33.

Figure 2A:
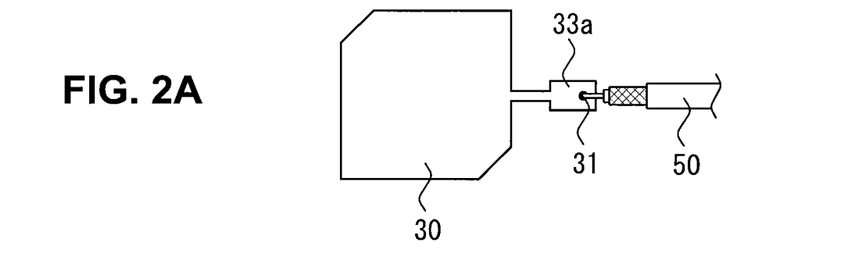
FIGS. 2A and 2B are top views for explaining other examples of an impedance adjusting section of the patch antenna device of the present invention, which illustrate an antenna element section and the periphery thereof.
Figure 2B:
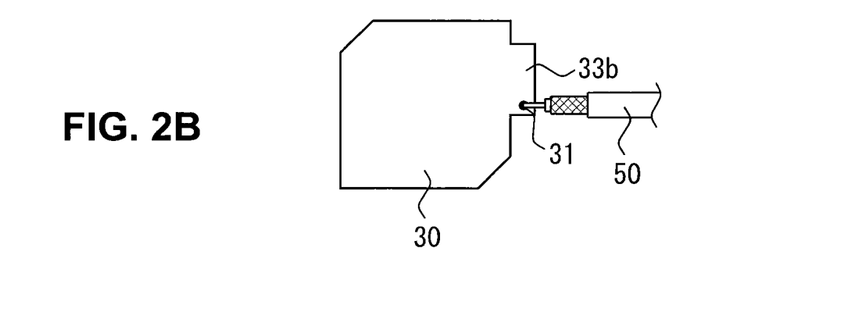

Although the impedance adjusting section 33 has a symmetrical shape with respect to the center line of the antenna element section 30 in the illustrative example, the present invention is not limited to this. Here, with reference to FIGS. 2A and 2B, other examples of the impedance adjusting section will be described. FIGS. 2A and 2B are top views for explaining other examples of the impedance adjusting section of the patch antenna device of the present invention, which illustrate the antenna element section and the periphery thereof. In FIGS. 2A and 2B, the same reference numerals as those in FIGS. 1A to 1C denote the same parts as those in FIGS. 1A to 1C, and the detailed descriptions thereof will be omitted here. Since the impedance adjusting section only needs to be provided between the cable 50 and the antenna element section 30, a configuration as illustrated in FIG. 2A is possible in which an impedance adjusting section 33a is provided at a location away from the antenna element section 30. Further, as illustrated in FIG. 2B, the center of an impedance adjusting section 33b may be displaced from the center line of the antenna element section 30. At any rate, in the single-point feeding type circular polarized patch antenna, the feeding section 31 is provided on the center line of the antenna element 30 in principle. However, the feeding section may be offset depending on the adjustment range.

Referring back to FIGS. 1A to 1C, the cable 50 is fixed by means of the protruded pattern of the impedance adjusting section 33 and the rear side ground conductor 20. Further, if necessary, a ground pattern that can be connected to the ground line of the cable 50 may also be provided around the cutout portion 11 on the front side of the substrate 10. Further, a countermeasure preventing accidental decoupling of the cable may be taken.

The reporting circuit section 40 is connected to the antenna element section 30. The reporting circuit section 40 is configured to report the state of the antenna device to the outside and is provided on the substrate 10. As illustrated in FIGS. 1A to 1C, in the patch antenna device of the present invention, a signal from the cable 50 is connected to the reporting circuit section 40 through the antenna element section 30. The reporting circuit section 40 is constituted by a reporting section including e.g., a light-emitting diode 45 and a speaker 46 and a circuit section including peripheral circuits of the light-emitting diode 45 and the speaker 46. The reporting circuit section 40 is provided on the front and rear surfaces of the substrate 10 by using a speaker through-hole 12 or a light-emitting diode through-hole 13 formed in the substrate 10 as needed. Although the patch antenna device has the light-emitting diode and the speaker in the illustrative example, the present invention is not limited to this, but the patch antenna device may have only one of the light-emitting diode and the speaker. Further, in the patch antenna device of the present invention, the reporting circuit section is not limited to the light-emitting diode or speaker, but may be any device that can report the state of the antenna device.

Figure 3:
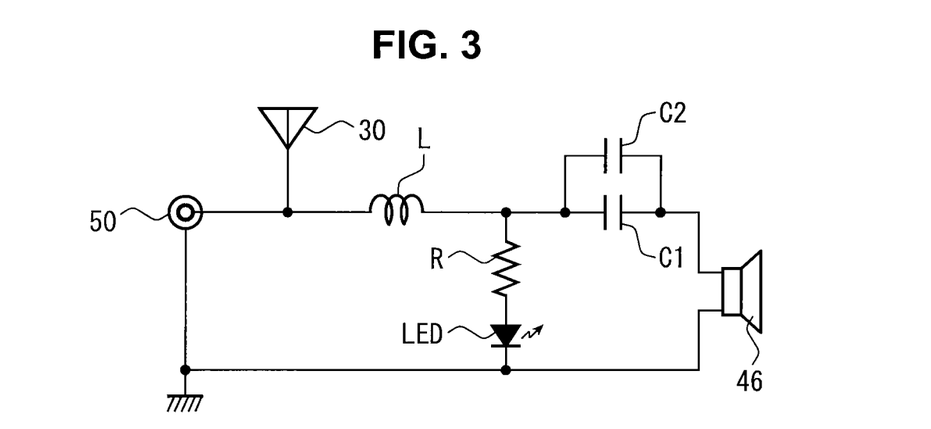
FIG. 3 is an equivalent circuit diagram in the case where a reporting circuit section has a light-emitting diode and a speaker.

FIG. 3 is an equivalent circuit diagram in the case where the reporting circuit section has the light-emitting diode (LED) and the speaker. As shown therein, in the reporting circuit section 40, a signal from the cable 50 is supplied to the antenna element section 30 as well as to a DC circuit side through a coil L for filtering a microwave signal. The DC circuit side is constituted by a light-emitting diode side circuit including a resistor R and a light-emitting diode LED and a low-frequency circuit (a speaker side circuit including capacitors C1, C2 and the speaker 46).

Figure 4:
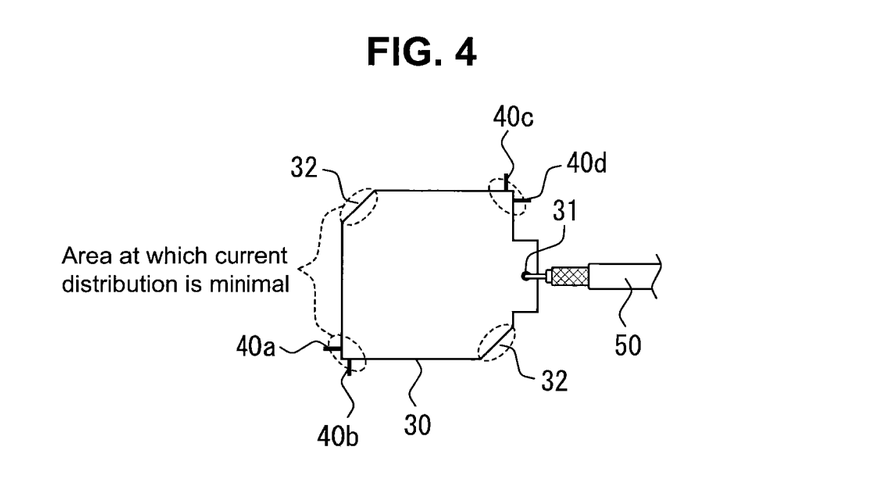
FIG. 4 is a top view for explaining the current distribution in the patch antenna device of the present invention, which illustrates the antenna element section and the periphery thereof.

The reporting circuit section 40 is connected around an area in the periphery of the antenna element section 30 other than the peripheral area thereof where the feeding section 31 is provided and at which current distribution is minimal. With reference to FIG. 4, the connection position of the reporting circuit section 40 will be described. FIG. 4 is a top view for explaining the concept of the current distribution in the patch antenna device of the present invention, which illustrates the antenna element section and the periphery thereof. In FIG. 4, the same reference numerals as those in FIGS. 1A to 1C denote the same parts as those in FIGS. 1A to 1C, and the detailed descriptions thereof will be omitted here. In the single-point feeding type circular polarized patch antenna, the current distribution on the antenna element section 30 is strong around the feeding section 31 and around the center portions of four edges of the antenna element section 30 and, as shown in FIG. 4, the current distribution is minimal around areas in the periphery (areas surrounded by broken lines in FIG. 4) of the antenna element section existing on the line connecting the opposing degeneracy-removing element sections and its orthogonal line. The areas where the current distribution is minimal are areas where the current flowing on the antenna that rotates with time is always kept to substantially zero. The current distribution becomes stronger from the periphery to the center of the antenna element section. The most characteristic point of the patch antenna device of the present invention is that the circuit of the reporting circuit section 40 is connected around the area at which the current distribution is minimal. Since the circuit of the reporting circuit section 40 only needs to be connected around the area at which the current distribution is minimal, the connection position of the reporting circuit section 40 is not limited to an area at which the current distribution is just minimal but may be set with a certain amount of allowance.

More specifically, in the single-point feeding type circular polarized patch antenna having a square shape illustrated in FIG. 4, the current distribution is minimal around areas in the corners at which the degeneracy-removing elements sections 32 are provided and areas in the corners at which the degeneracy-removing elements sections 32 are not provided. Therefore, the reporting circuit section 40 may be connected around any of the above-mentioned areas.

Although the reporting circuit section 40 is connected to the antenna element section 30 by a circuit pattern extending from the antenna element section 30 in the illustrative example, the present invention is not limited to this. For example, a configuration may be adopted in which a through-hole is formed in the antenna element section and, the antenna element section 30 is connected to the rear side reporting circuit section through the formed through-hole.

Referring to FIG. 1A, the reporting circuit section 40 is connected to the left-side neighborhood on the lower-left corner of the antenna element section 30. However, the present invention is not limited to this, but the reporting circuit section 40 only needs to be connected to the area around which the current distribution is minimal. That is, the reporting circuit section 40 may be connected to a left-side neighborhood 40a at the lower-left corner of the antenna element section 30, a lower-side neighborhood 40b at the lower-left corner, an upper-side neighborhood 40c at the upper-right corner, or a right-side neighborhood 40d at the upper-right corner. As described above, in the case where the degeneracy-removing element sections 32 are loaded in the periphery of the antenna element section so as to be opposite to each other across the antenna element section 30, the reporting circuit section 40 may be connected around the area in the periphery of the antenna element section 30 existing on the line orthogonal to the line connecting to the opposing degeneracy-removing element sections 32. Further, the reporting circuit section 40 may be connected adjacent to the corner portion at which the degeneracy-removing element section 32 is provided. Although the reporting circuit section 40 is connected adjacent to the corner portion (to a portion shifted from the corner) in the illustrative example, the reporting circuit section 40 may be connected to the corner portion itself.

Figure 5A:
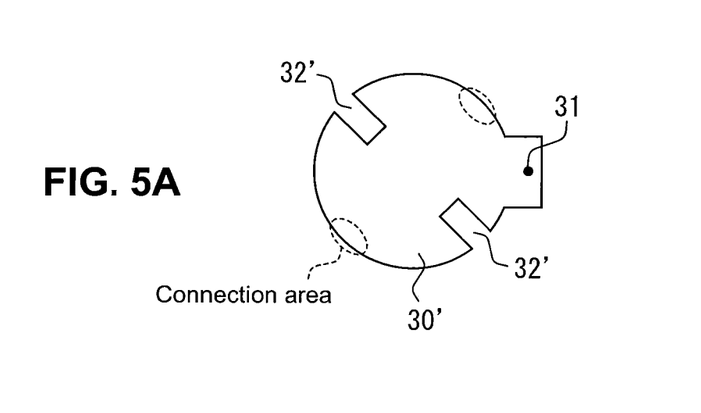
FIG. 5A is a top view of an example of the antenna element section in which concave portions are formed as degeneracy-removing element sections.
Figure 5B:
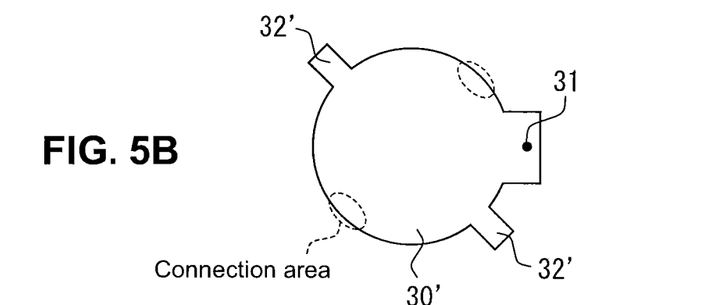
FIG. 5B is a top view of an example of the antenna element section in which convex portions are formed as the degeneracy-removing element sections.

Although the antenna element section has a square shape in FIGS. 1A to 1C, the present invention is not limited to this, but the antenna element section 30 may have any shape as long as it can transmit and receive a circular polarized wave. For example, the antenna element section 30 may have a circular shape. FIGS. 5A and 5B are views for explaining other shapes of the antenna element section of the patch antenna device according to the present invention. FIG. 5A is a top view of an example of the antenna element section in which concave portions are formed as the degeneracy-removing element sections. FIG. 5B is a top view of an example of the antenna element section in which convex portions are formed as the degeneracy-removing element sections. In FIGS. 5A and 5B, the same reference numerals as those in FIGS. 1A to 1C denote the same parts as those in FIGS. 1A to 1C, and the detailed descriptions thereof will be omitted here. Even the antenna element section having the shapes of the illustrative examples can transmit and receive a circular polarized wave. As in the case of the square-shaped antenna element section, the current distribution is minimal around areas in the periphery of an antenna element section 30' existing on the line connecting the opposing degeneracy-removing element sections 32' or its orthogonal line. Thus, as illustrated, in the patch antenna device according to the present invention, the wiring to the reporting circuit section 40 is drawn from the area in the periphery (a connection area) of the antenna element section existing on the line orthogonal to the line connecting the opposing degeneracy-removing element sections 32' loaded in the antenna element section 30'. Further, the reporting circuit section 40 may be connected around the degeneracy-removing element section 32'. More specifically, in the case where the concave portion is provided as the degeneracy-removing element section as illustrated in FIG. 5A, the reporting circuit section 40 may be connected to the corner of the entrance of the concave portion. Further, in the case where the convex portion is provided as the degeneracy-removing element section as illustrated in FIG. 5B, the reporting circuit section 40 may be connected to the corner of the leading end of the convex portion.

Figure 6A:
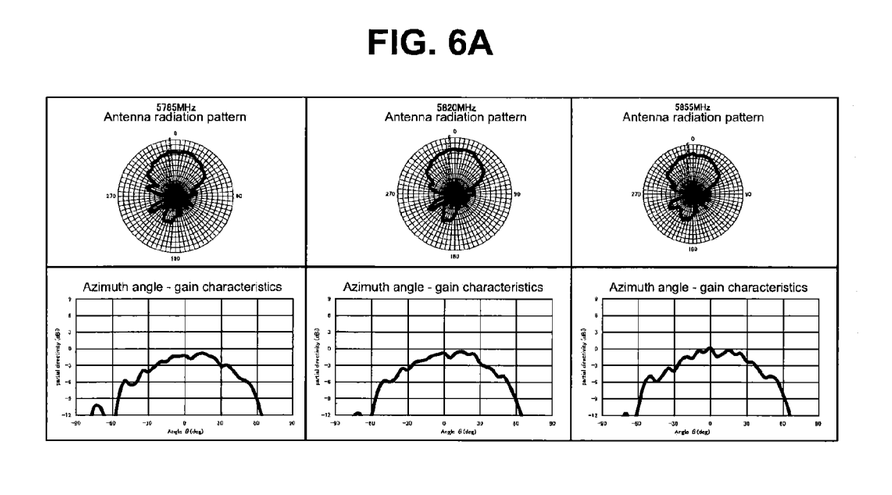
FIG. 6A illustrates results of the patch antenna device of the present invention having the configuration illustrated in FIGS. 1A to 1C.
Figure 6B:
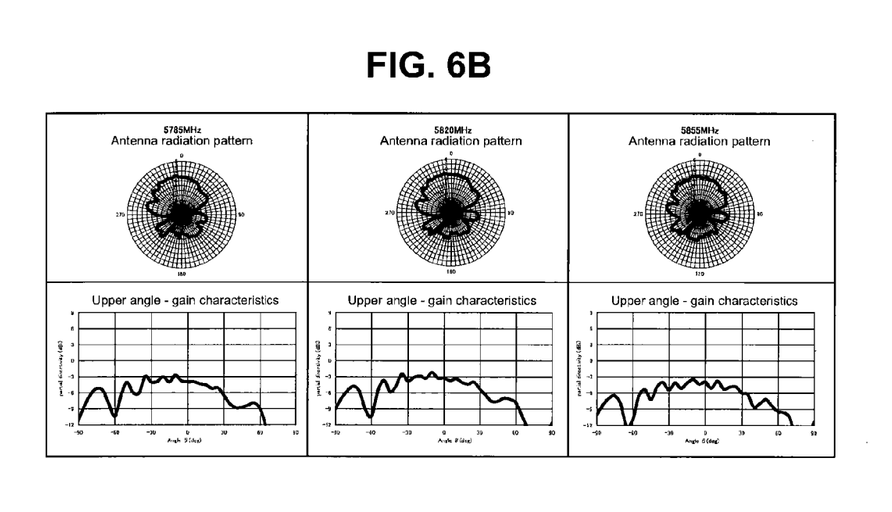
FIG. 6B illustrates results of a conventional patch antenna device as a comparative example, which has a configuration in which the reporting circuit section is directly connected to the feeding section.

With reference FIGS. 6A and 6B, a comparison is made between characteristics of a patch antenna device in which the reporting circuit section is directly connected to the feeding section without intervention of the antenna element section and characteristics of a patch antenna device in which the reporting circuit section is connected around the area in the antenna element section at which the current distribution is minimal as illustrated in FIGS. 1A to 1C. FIGS. 6A and 6B are graphs illustrating gain characteristics and antenna radiation patterns with respect to the azimuth angle in the case where the frequencies are 5,785 MHz, 5,820 MHz and 5,855 MHz, respectively. FIG. 6A illustrates results of the patch antenna device of the present invention having the configuration illustrated in FIGS. 1A to 1C, and FIG. 6B illustrates results of a conventional patch antenna device as a comparative example, which has a configuration in which the reporting circuit section is directly connected to the feeding section. As illustrated, in all the measured frequency bands, the gain characteristics of the patch antenna device of the present invention are improved. Further, with regard to the directivity of the patch antenna device, the patch antenna device of the present invention has characteristics in that the radiation is stronger on the antenna element side. That is, the patch antenna device of the present invention has desirable characteristics as the in-vehicle antenna device such as an ETC antenna.

As described above, according to the present invention, the antenna signal characteristics can be improved by connecting the reporting circuit section to the area around which the current distribution in the antenna element section is minimal.

Referring back to FIGS. 1A to 1C, since the reporting circuit section 40 is connected around the corner portion of the antenna element section 30 at which the current distribution is minimal in the patch antenna device of the present invention, the elements constituting the reporting circuit section 40 can be arranged along the periphery of the antenna element section 30. As described using FIG. 4, in the patch antenna device of the present invention, there is a lot of flexibility in the connection position of the reporting circuit section 40 to increase the flexibility in the layout of elements on the substrate 10, thereby enabling a reduction in the size of the patch antenna device.

Further, as illustrated in FIG. 1C, the light-emitting diode 45 and the speaker 46 constituting the reporting section of the reporting circuit section 40 are provided on the surface on which the ground conductor 20 is provided, i.e., on the rear surface of the substrate 10, and elements such as a coil and a capacitor constituting the circuit section are provided on the surface on which the antenna element section 30 is provided, i.e., on the front surface of the substrate 10. The speaker 46 and the ground conductor 20 may be electrically isolated by an insulating sheet, etc. as needed. With this arrangement, the circuit section having elements of comparatively low height can be collected on the front surface side of the substrate 10, and the speaker 46 or a light-emitting diode 45 having a comparatively high height can be collected on the rear surface side of the substrate 10. Alternatively, all the elements may be collected on one surface side as needed. This enables a reduction in the thickness of the patch antenna device. Further, as illustrated, the light-emitting diode 45 may be provided on the convex portion formed in the substrate 10 so as to prevent the light emitting diode 45 and the speaker 46 from being overlapped with each other in the vertical direction in FIG. 1C. As a result, when viewed from the side at which the speaker 46 is provided, the light emitted from the light-emitting diode 45 is not influenced by the speaker 46.

The circuit section of the reporting circuit section 40 may be provided on the front surface side of the substrate 10 so as to be overlapped with the ground conductor 20 on the rear surface side thereof. In general, the ground conductor 20 is provided so as to cover substantially the entire rear surface of the substrate, and the antenna element section 30 has an area smaller than that of the ground conductor 20. Thus, the margin area of the substrate around the antenna element section 30 is overlapped with the ground conductor 20 in terms of the vertical position as viewed from the side. Therefore, the circuit section of the reporting circuit section may be provided on the margin area.

When being used, the patch antenna device of the present invention is attached to, e.g., a windshield of a vehicle, more specifically, attached to the windshield from the vehicle interior side. Accordingly, the antenna element section 30 side faces the windshield side, and the light-emitting diode 45 and the speaker 46 constituting the reporting section faces the vehicle interior side.

Figure 7A:
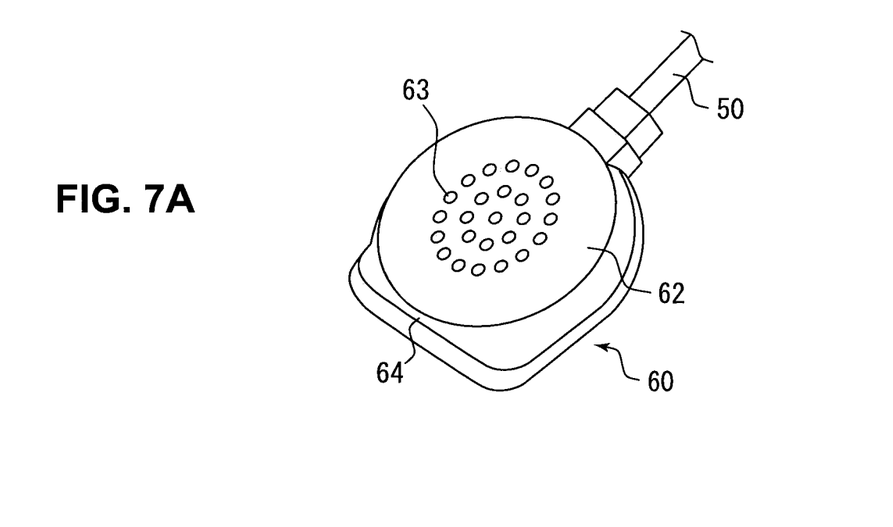
FIG. 7A is a perspective view thereof.
Figure 7B:
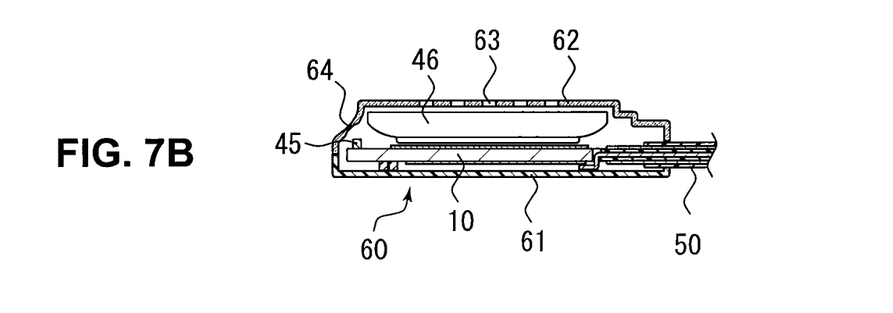
FIG. 7B is a horizontal cross-sectional view thereof.

With reference to FIGS. 7A and 7B, the patch antenna device of the present invention in a state of being covered by a housing will be described. FIGS. 7A and 7B are views illustrating the patch antenna device of the present invention when being used, FIG. 7A is a perspective view thereof, and FIG. 7B is a horizontal cross-sectional view thereof. In FIGS. 7A and 7B, the same reference numerals as those in FIGS. 1A to 1C denote the same parts as those in FIGS. 1A to 1C, and the detailed descriptions thereof will be omitted here. As illustrated, the substrate 10, the light-emitting diode 45, the speaker 46, and the like are covered by a housing 60. The housing 60 defines the outer shape of the patch antenna device. The housing 60 is constituted by a base housing 61 that covers the side on which the antenna element section 30 is provided and a transparent housing 62 that covers the side on which the reporting section such as the light-emitting diode 45 and the speaker 46 is provided. The base housing 61 is made of a material that transmits an electromagnetic wave emitted from the antenna element section 30 therethrough, such as ABS resin. The base housing 61 is attached to, e.g., a windshield of a vehicle from the vehicle interior side. The transparent housing 62 is made of a transparent or semi-transparent material such as polycarbonate, epoxy resin, acrylic resin, or ABS resin. Like the transparent housing 62, the base housing 61 may also be made of a transparent or semi-transparent material.

The transparent housing 62 is provided with a plurality of holes 63 allowing transmission of the sound from the speaker 46. In the case of the patch antenna device where the speaker 46 is not used and only the light-emitting diode 45 is used as the reporting section, the holes 63 need not be formed.

A part 64 of the transparent housing 62 corresponding to the position of the light-emitting diode 45 has a reduced thickness than other portions of the transparent housing 62 so as to allow better transmission of light emitted from the light-emitting diode 45. In place of having reduced thickness, the part of the transparent housing 62 corresponding to the position of the light-emitting diode 45 may have a lens section having a lens effect. The lens section may be formed by integrally molding the thickness of the transparent housing 62 into a convex lens. With this configuration, the light emitted from the light-emitting diode 45 can be collected to improve visibility. As described above, the part 64 corresponding to the position of the light-emitting diode 45 can be integrally formed with the transparent housing 62, facilitating production or assembly process.

In the illustrative example, the cable 50 is fitted to the cutout portion of the substrate 10, and the core of the cable 50 is bent so as to be connected to the feeding section, whereby the cable 50 is appropriately accommodated in the housing 60. However, the present invention is not limited to this, but a configuration may be adopted in which the height position of the core of the cable 50 and the height position of the substrate 10 are made to be aligned as shown in FIG. 1C.

The patch antenna device according to the present invention is not limited to the above illustrative examples, but various modifications may be made without departing from the scope of the present invention.

The invention claimed is:

1. An in-vehicle patch antenna device, the patch antenna device comprising:
a substrate;
a ground conductor provided on the substrate;
an antenna element section having a feeding section and degeneracy-removing element sections, which is provided on a surface of the substrate opposite to a surface on which the ground conductor is provided; and
a reporting circuit section for reporting a state of the patch antenna device to an outside, which is provided on the substrate and connected around an area in a periphery of the antenna element section at which current distribution is minimal other than the peripheral area thereof where the feeding section is provided, the area in the periphery existing on a line so as to be opposite to each other across the antenna element section wherein the line is orthogonal to another line connecting the degeneracy-removing element sections.

2. The patch antenna device according to claim 1, in which the antenna element section has a pattern protruding from the periphery thereof capable of adjusting impedance depending on a width of the pattern, and the feeding section of the antenna element section is provided within the protruding pattern.

3. The patch antenna device according to claim 1, in which the reporting circuit section is provided along the periphery of the antenna element section.

4. The patch antenna device according to claim 1, in which the reporting circuit section includes a reporting section and a circuit section, the reporting section being provided on the surface of the substrate on which the ground conductor is provided, and the circuit section being provided on the surface of the substrate on which the antenna element section is provided.

5. The patch antenna device according to claim 4, in which the reporting section includes a light-emitting diode and/or a speaker.

6. The patch antenna device according to claim 4, which further comprises a housing that defines an outer shape of the patch antenna device, wherein one side of the housing that covers the surface on which the reporting section is provided is made of a transparent or semi-transparent material, and a part of the housing corresponding to a position of the reporting section has a reduced thickness than the other portions of the housing.

7. The patch antenna device according to claim 1, in which the substrate has a cutout portion to which a cable connected to the feeding section of the antenna element section is fitted.

8. The patch antenna device according to claim 7, in which the ground conductor extends up to around the cutout portion.

\* \* \* \* \*

UNITED STATES PATENT AND TRADEMARK OFFICE
CERTIFICATE OF CORRECTION

| | | |
|---|---|---|
| PATENT NO. | : 8,692,725 B2 | Page 1 of 1 |
| APPLICATION NO. | : 12/809466 | |
| DATED | : April 8, 2014 | |
| INVENTOR(S) | : Shinji Ilno et al. | |

It is certified that error appears in the above-identified patent and that said Letters Patent is hereby corrected as shown below:

On the title page item 56

Page 1, under Foreign Patent Documents:

Replace "CN 101049878 7/2009" with --CN 101479878 7/2009--

Page 2, under Foreign Patent Documents:

Replace "JP 60-126963 8/1985" with --JP 60-128963 7/1985--

Replace "JP 7-38381 4/1995" with --JP 7-36381 4/1995--

Replace "WO 2008/062746 5/2005" with --WO 2008/062746 5/2008--

Replace "PCT/JP2012/050627 9/2012" with --PCT/JP2012/050527 3/2012--

Signed and Sealed this
Eighth Day of March, 2016

Michelle K. Lee
*Director of the United States Patent and Trademark Office*

UNITED STATES PATENT AND TRADEMARK OFFICE
CERTIFICATE OF CORRECTION

PATENT NO. : 8,692,725 B2  
APPLICATION NO. : 12/809466  
DATED : April 8, 2014  
INVENTOR(S) : Shinji Ilno et al.

Page 1 of 1

It is certified that error appears in the above-identified patent and that said Letters Patent is hereby corrected as shown below:

On the title page item 56

Page 1, under Foreign Patent Documents:

Replace "CN 101049878 7/2009" with --CN 101479878 7/2009--

Page 2, under Foreign Patent Documents:

Replace "JP 60-126963 8/1985" with --JP 60-126963 7/1985--

Replace "JP 7-38381 4/1995" with --JP 7-36381 4/1995--

Replace "WO 2008/062746 5/2005" with --WO 2008/062746 5/2008--

Replace "PCT/JP2012/050627 9/2012" with --PCT/JP2012/050527 3/2012--

This certificate supersedes the Certificate of Correction issued March 8, 2016.

Signed and Sealed this  
Fifth Day of April, 2016

Michelle K. Lee  
*Director of the United States Patent and Trademark Office*